(12) United States Patent
Magee

(10) Patent No.: US 11,279,182 B2
(45) Date of Patent: Mar. 22, 2022

(54) MAGNETIC/OSMOTIC INNER TUBE

(71) Applicant: Florida A&M University, Tallahassee, FL (US)

(72) Inventor: Charles Magee, Cairo, GA (US)

(73) Assignee: Florida A&M University, Tallahassee, FL (US)

( * ) Notice: Subject to any disclaimer, the term of this patent is extended or adjusted under 35 U.S.C. 154(b) by 0 days.

(21) Appl. No.: 17/035,286

(22) Filed: Sep. 28, 2020

(65) Prior Publication Data

US 2021/0094366 A1 Apr. 1, 2021

Related U.S. Application Data

(60) Provisional application No. 62/908,241, filed on Sep. 30, 2019.

(51) Int. Cl.
*B60C 19/12* (2006.01)
*B60C 5/10* (2006.01)
*B60C 19/00* (2006.01)

(52) U.S. Cl.
CPC .............. *B60C 19/122* (2013.01); *B60C 5/10* (2013.01); *B60C 2019/005* (2013.01)

(58) Field of Classification Search
CPC ....... B60C 19/12; B60C 19/127; B60C 5/004; B60C 5/005; B60C 5/10; B60C 2019/005; B60C 17/066
USPC .......................................... 152/510, 511, 512
See application file for complete search history.

(56) References Cited

U.S. PATENT DOCUMENTS

2005/0277712 A1* 12/2005 Daly ...................... B60C 19/003
524/17
2019/0023084 A1* 1/2019 Sato ........................... B60C 5/14

OTHER PUBLICATIONS

Bartee et al., Principles of Biology, Passive Transport: Osmosis, May 18, 2016, pp. 1-2 (Year: 2016).*
University of Texas, Chemistry 302, Osmosis, 2013, pp. 1-2 (Year: 2013).*
Biology Dictionary, Osmotic Pressure, Apr. 28, 2017, p. 1 (Year: 2017).*

* cited by examiner

*Primary Examiner* — Katelyn W Smith
*Assistant Examiner* — Sedef E Paquette
(74) *Attorney, Agent, or Firm* — FisherBroyles, LLP

(57) ABSTRACT

Various embodiments are directed to a magnetic and osmotic inner tube for insertion in vehicle tires. The magnetic and osmotic inner tube may include a nonpermeable membrane ring coupled to a semipermeable membrane ring, an O-ring, and a group of polar magnets. The nonpermeable membrane ring may be coated with a sealant and store hypertonic fluid and plugging materials. The semipermeable membrane ring may store hypotonic fluid and plugging materials. When a vehicle tire is punctured by an object, the hypotonic fluid and the plugging materials are drawn by osmosis through the semipermeable membrane ring into the hypertonic fluid of the nonpermeable membrane ring to create an osmotic pressure on the nonpermeable membrane ring that causes the O-ring to seal the puncture. The polar magnets may be arranged, in parallel, to generate opposing magnetic forces that create a magnetic field that supports a vehicle weight.

18 Claims, 3 Drawing Sheets

MAGNETIC/OSMOTIC INNER TUBE

CROSS REFERENCE TO RELATED APPLICATION

This application claims the benefit of U.S. Provisional Application No. 62/908,241, filed Sep. 30, 2019, the disclosure of which is incorporated, in its entirety, by this reference.

BACKGROUND

Vehicle operators are often faced with the harrowing situation of attending to (e.g., changing) a flat tire in potentially unsafe environments such as on deserted roads, during nighttime, during hazardous weather conditions (e.g., rain or snow storms), on bridges traversing a body of water, and/or in unsafe neighborhoods. As a result, many operators may choose to avoid these potentially unsafe environments by continuing to drive a vehicle with a tire puncture (and thereby risk further damage to the tire as well as the wheel on which the tire is mounted) until reaching a repair shop or a safe, level area to attend to the flat tire.

Traditional solutions for managing flat tires may include a variety of "run-flat" tire technologies designed to enable vehicles to continue to safely operate following a tire puncture. These solutions may include self-sealing, self-supporting, and/or auxiliary supported tires. The aforementioned traditional tire technologies, however, suffer from a number of drawbacks. For example, self-sealing tires are typically designed to permanently repair most tread-area punctures (e.g., punctures from nails, bolts or screws up to a diameter of 3/16 of an inch) by incorporating, into a standard tire construction, an extra lining inside of the tire that is located under the tread area and coated with a puncture sealant. Thus, when a tire puncture occurs, self-sealing tires will provide a seal around an object where the tire is punctured and then fill in the hole in the tread when the object is removed. However, self-sealing tires are still subject to failures due to sidewall damage or complete blowouts. Self-supporting tires feature reinforced sidewall construction that will continue supporting a vehicle in the event of a loss of air pressure such that the vehicle may continue operating for a predetermined distance and at a predetermined speed (e.g., 50 miles at 50 miles per hour). However, self-supporting tires require vehicles to include tire pressure monitoring systems to as to alert vehicle operators that they have lost air pressure. Without these tire pressure monitoring systems, drivers may exceed the speed and or distance limitations of self-supporting tires thereby merely delaying the effects of a tire puncture upon failure. Auxiliary supported systems combine unique wheels and tires (i.e., nonstandard) used as original equipment for new vehicle applications. In these systems, following a tire puncture, the flat tire's tread rests on a support ring attached to the wheel when the tire loses pressure. Thus, these systems place most of the mechanical task of providing run-flat capability on the wheel thereby minimizing the burden of the tire to support the vehicle while driving. However, due to the unique wheel requirements of auxiliary supported systems, they are incompatible with standard tires, thus making them costly to maintain when changing/replacing tires on a vehicle.

SUMMARY

As will be described in greater detail below, the instant disclosure generally relates to a magnetic and osmotic inner tube that may be installed and utilized in vehicle tires. In one example, the magnetic and osmotic inner tube may include a nonpermeable membrane ring formed by an elastic material. The nonpermeable membrane ring may have an exterior surface coated with a sealant and include an interior housing that stores a volume of hypertonic fluid (e.g., saline solution) and a group of non-metallic suspended plugging materials in the hypertonic fluid. A semipermeable membrane ring may be coupled to the nonpermeable membrane ring. The semipermeable membrane ring may include an interior housing that stores a volume of a hypotonic fluid (e.g., fresh water) and a group of suspended plugging materials in the hypotonic fluid. A puncture of a vehicle tire may be created by an object that penetrates the semipermeable membrane ring and the nonpermeable membrane ring. The hypotonic fluid in the semipermeable membrane ring is drawn by osmosis into the hypertonic fluid stored in the nonpermeable membrane ring to create an osmotic pressure on the nonpermeable membrane ring. The osmotic pressure on the nonpermeable membrane ring may cause an O-ring including an adhesive coupled to the exterior surface of the nonpermeable membrane ring to seal the exterior surface of the nonpermeable membrane ring to a wall of the vehicle tire. The group of suspended plugging materials may be drawn, via rotational forces generated by the vehicle tire, to the puncture created by the object. The magnetic and osmotic inner tube may further include a group of polar magnets arranged, in parallel, in a ring formation on a wall coupling the nonpermeable membrane ring to the semipermeable membrane ring. Each of the polar magnets (with the exception of a single polar magnet located at a connecting seam on the nonpermeable membrane ring) may have a same polarity with respect to each other thereby generating opposing magnetic forces along the ring formation. The opposing magnetic forces may generate a magnetic field that supports a vehicle weight to allow for continued driving.

In some examples, the nonpermeable membrane ring may include a fluid inlet valve that receives the hypotonic fluid and the suspended plugging materials from an external source into its interior housing and the semipermeable membrane ring may include a fluid inlet valve that receives the hypertonic fluid and the suspended plugging materials from an external source into its interior housing.

In some embodiments, a colored dye may be injected into the hypotonic fluid and suspended plugging materials in the nonpermeable membrane ring. Similarly, a different colored dye may be injected into the hypertonic fluid and suspended plugging materials in the semipermeable membrane ring. In one example, the colored dyes may be utilized to identify the location of the vehicle tire puncture when a portion of the hypotonic fluid escapes prior to the O-ring sealing the exterior surface of the nonpermeable membrane ring to the wall of the vehicle tire.

In some examples, the opposing magnetic forces generated by the polar magnets prevent compression of the ring formation from pressure caused by a vehicle weight on the vehicle tire on a road surface when the vehicle tire is in motion. In some embodiments, the osmotic pressure on the nonpermeable membrane ring causes the O-ring to seal the exterior surface of the nonpermeable membrane ring to the wall of the vehicle tire. In some examples, the plugging materials stored in the nonpermeable membrane ring and the semipermeable membrane ring may include a collection of hair, feathers, and/or fish scales.

In some examples, the instant disclosure presents a system that includes one or more vehicle tires and a magnetic and osmotic inner tube. The vehicle tire (or each of a set of vehicle tires) may be coupled to a magnetic and osmotic inner tube following installation. The magnetic and Features from any of the above-mentioned embodiments may be used in combination with one another in accordance with the general principles described herein. These and other embodiments, features, and advantages will be more fully understood upon reading the following detailed description in conjunction with the accompanying drawings and claims.

DETAILED DESCRIPTION

The present disclosure is generally directed to a magnetic and osmotic inner tube (MOIT) for installation in vehicle tires. In operation, the MOIT may be utilized to convert any air inflatable tire into a never flat tire (NFT), thereby enabling continued mobility of a vehicle following a tire puncture. As will be described in greater detail below, the MOIT described herein may be an apparatus composed of (1) a set of polar magnets, (2) a nonpermeable membrane containing hypertonic fluid (e.g., saline) and non-metallic plugging materials, (3) a semipermeable membrane containing hypotonic fluid (e.g., fresh water) and non-metallic plugging materials, and (4) a mechanical seal (e.g., an O-ring). In some embodiments, the MOIT may utilize osmotic pressure. The osmotic pressure may be created when the hypotonic fluid is drawn through the semipermeable membrane into the hypertonic fluid (e.g., saline solution) of the nonpermeable membrane, thereby enabling the O-ring (which is coupled to the nonpermeable membrane) to nearly instantaneously seal the exterior surface of the nonpermeable membrane ring to a wall of a vehicle tire such that sufficient air pressure is maintained to allow for continued driving of the vehicle affected by the tire puncture. In other embodiments, the MOIT may utilize the set of polar magnets arranged, in parallel, in a ring formation of facing like magnetic poles (e.g., south poles facing south poles and north poles facing north poles) such that a magnetic field is generated from the opposing magnetic forces sufficient to prevent compression of a punctured tire following a loss of air pressure and thereby support the weight of an affected vehicle so that it may continue to be driven. By utilizing generated osmotic pressure and a magnetic field in this way, the MOIT apparatus described herein may overcome several drawbacks associated with conventional run flat tires including requiring specially designed tires, tire pressure monitoring systems, and unique wheel/tire combinations that are incompatible with standard vehicle tires.

Embodiments of the disclosure now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
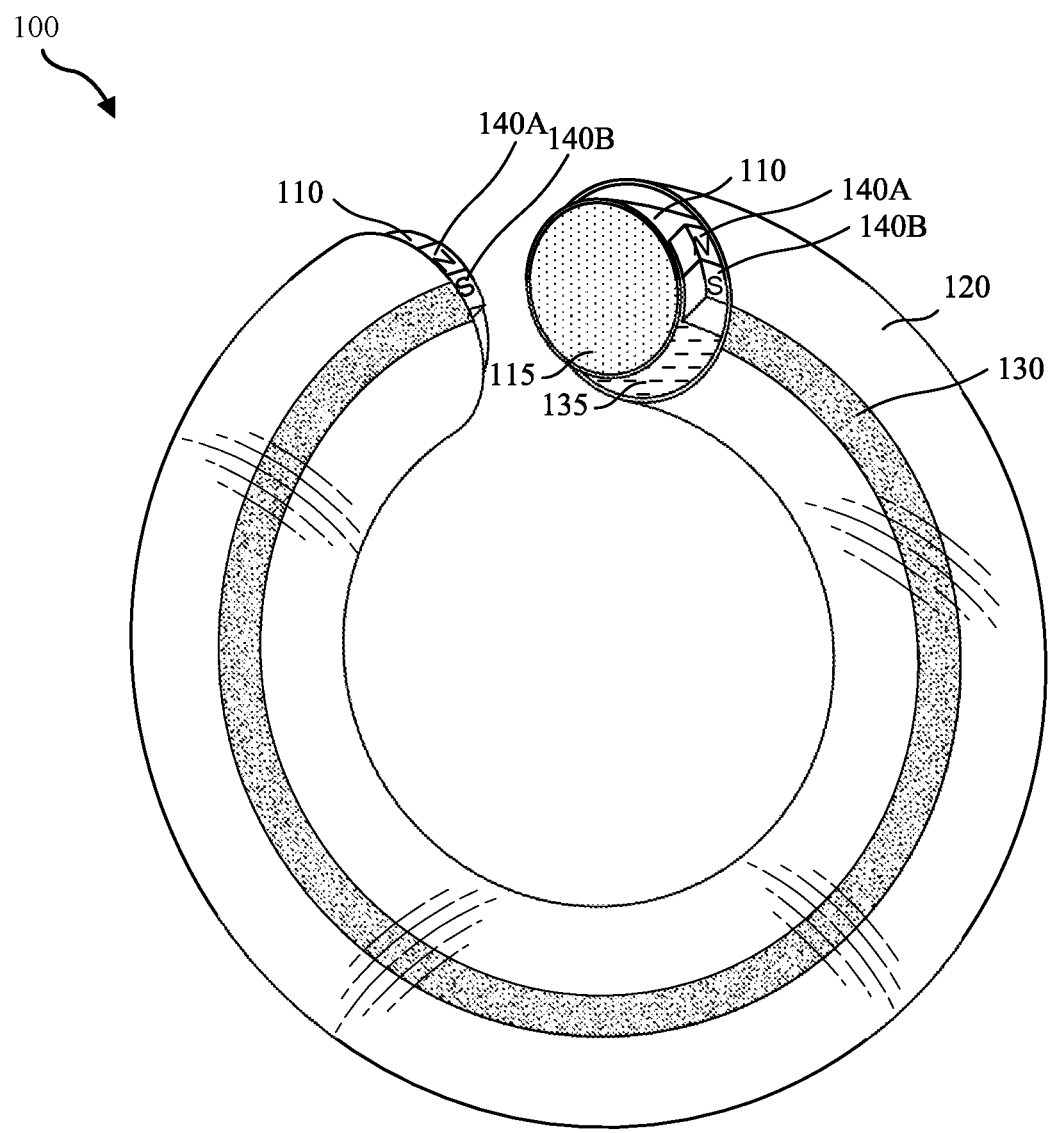
FIG. 1 illustrates a perspective view of a magnetic and osmotic inner tube, according to an example embodiment.

FIG. 1 illustrates an example magnetic and osmotic inner tube (MOIT) 100 for installation in a standard or conventional vehicle tire. MOIT 100 may be composed a number of components including a semipermeable membrane ring 110, a nonpermeable membrane ring 120, an O-ring 130, and polar magnets 140A and 140B. In some examples, semipermeable ring 110 may be coupled to nonpermeable membrane ring 120 and house (e.g., in an interior core) a volume of hypotonic fluid 115 (e.g., fresh water). Semipermeable membrane ring 110 may be constructed of a suitable material that allows certain materials to pass through it via osmosis.

The term "vehicle" as used herein, generally refers to any machine utilized for transporting people or cargo. Example vehicles may include, without limitation, motor vehicles (e.g., automobiles, motorcycles, trucks, buses, etc.), railed vehicles, trailers, carts, amphibious vehicles, aircraft and/or spacecraft.

The term "hypotonic fluid" as used herein, generally refers to any fluid (such as fresh water) characterized by having low concentrations of dissolved salts (e.g., less than 500 parts per million) and/or other total dissolved solids. Hypotonic fluid may be obtained from a naturally occurring fresh water source such as atmospheric precipitation (e.g., in the form of mist, rain, snow, and/or frozen ice) or artificially produced by water purification (e.g., desalination of sea water).

In some examples, nonpermeable membrane ring 120 may be coupled to semipermeable membrane ring and O-ring 130. Nonpermeable membrane ring 120 may be formed by an elastic material (for shaping into a ring) and house (e.g., in an interior core) a volume of hypertonic fluid 135 (e.g., saline solution). In some embodiments, the exterior surface of nonpermeable membrane ring 120 may be coated with a sealant.

The term "hypertonic fluid" as used herein, generally refers to any fluid (such as a saline solution) characterized by having a greater concentration of solutes than another solution (e.g., fresh water). Hypertonic fluid may be obtained from natural saltwater sources (e.g. sea water) or artificially produced by water salination techniques (e.g., salination of fresh water).

In some examples, O-ring 130 may be coupled to the exterior surface of nonpermeable membrane ring 120. As will be described in greater detail below, O-ring 130 may include an adhesive that facilitates sealing MOIT 100 to a vehicle tire wall in response to osmotic pressure.

In some examples, polar magnets 140A and 140B may be arranged, in parallel, in a ring formation on an exterior wall coupling nonpermeable membrane ring 120 to semipermeable membrane ring 110. As will be described in greater detail below, each of a set of polar magnets 140A may have a same polarity with respect to one another thereby generating opposing magnetic forces which, in turn, generate a magnetic field. As will also be described in greater detail below, polar magnet 140B has an opposite polarity to polar magnet 140A and may be placed at a connecting seam on the exterior wall coupling nonpermeable membrane ring 120 to semipermeable membrane ring 110 between two polar magnets 140A.

Figure 2:
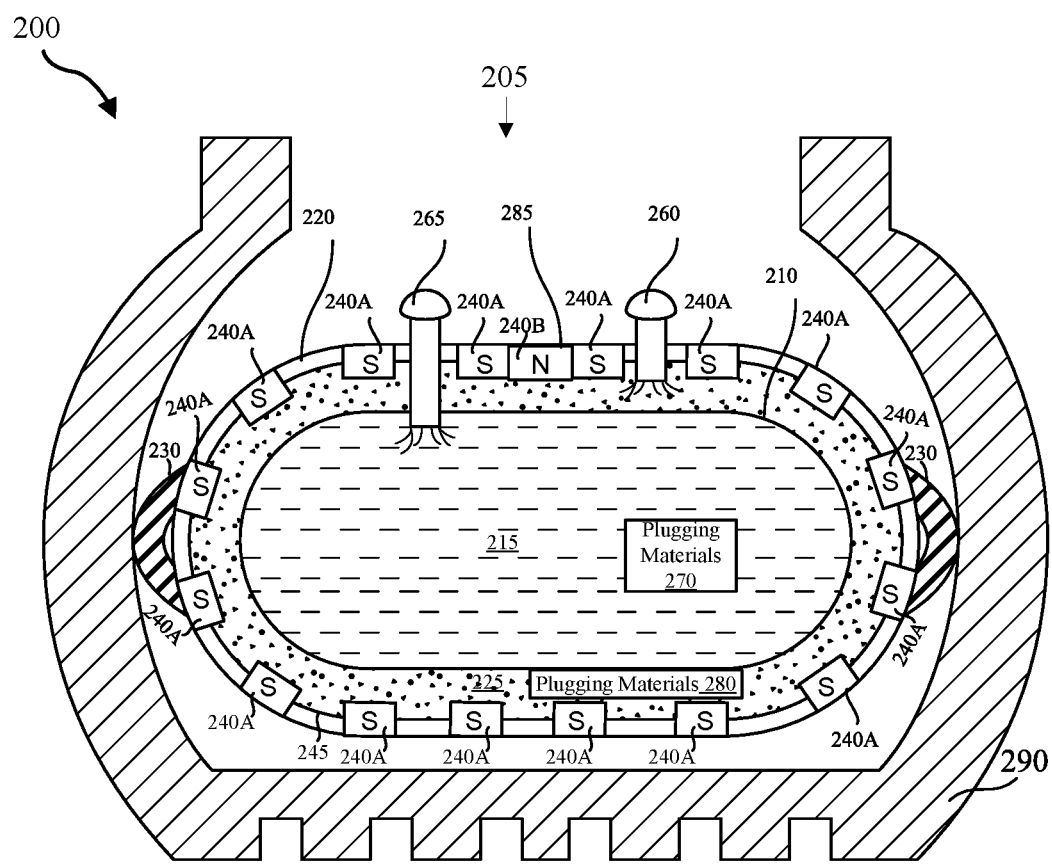
FIG. 2 illustrates a cross-sectional view of a system including a magnetic and osmotic inner tube installed in a vehicle tire, according to an example embodiment.

Turning now to FIG. 2, a cross-sectional view of a system 200 including a magnetic and osmotic inner tube (MOIT) 205 installed in a vehicle tire 290 is shown. In some embodiments, MOIT 205 may be installed in any air inflatable tire (such as a standard automobile or truck tire) to convert the tire into a never flat tire (NFT). In some examples, MOIT 205 may be removed from an existing vehicle tire and transferred to a new vehicle tire (e.g., as are result of tire replacement due to tread wear or an upgrade to a new tire or vehicle). As shown in FIG. 2, MOIT 205 may include a semipermeable membrane ring 210 that includes an interior housing that stores a volume of hypotonic fluid 215 (e.g., fresh water) and plugging materials 270. In some examples, plugging materials 270, which are suspended in hypotonic fluid 215, may include a collection of non-metallic materials such as hair, feathers, and/or fish scales. Semipermeable membrane ring 210 may also be coupled to a fluid inlet 265 which may be a valve for receiving a suspension containing hypotonic fluid 215 and plugging materials 270 from an external source (e.g., a fluid pump) into the interior housing of semipermeable membrane ring 210. In some examples, the interior housing of semipermeable membrane ring 210 may further include a colored dye that is injected (via fluid inlet 265) into the suspension containing hypotonic fluid 215 and plugging materials 270. As will be described in greater detail below, the colored dye may be utilized to identify a location of a puncture in vehicle tire 290.

MOIT 205 may further include a nonpermeable membrane ring 220 that is coupled to semipermeable membrane ring 210. In some examples, nonpermeable membrane ring 220 includes an interior housing that stores a volume of hypertonic fluid 225 (e.g., saline solution) and plugging materials 280. In some examples, plugging materials 280, which are suspended in hypertonic fluid 225, may include a collection of non-metallic materials such as hair, feathers, and/or fish scales. Nonpermeable membrane ring 220 may also be coupled to a fluid inlet 260 which may be a valve for receiving a suspension containing hypertonic fluid 225 and plugging materials 280 from an external source (e.g., a fluid pump) into the interior housing of nonpermeable membrane ring 220. In some examples, the interior housing of nonpermeable membrane ring 220 may further include a colored dye that is injected (via fluid inlet 260) into the suspension containing hypertonic fluid 225 and plugging materials 280. As will be described in greater detail below, the colored dye (which may have a different color than the colored dye injected into semipermeable membrane ring 210) may be utilized to identify a location of a puncture in vehicle tire 290 prior to the puncture being sealed by MOIT 205.

MOIT 205 may further include an O-ring 230, coupled to the exterior surface of nonpermeable membrane ring 220. As will be described in greater detail below, O-ring 230 may include an adhesive that facilitates sealing MOIT 205 to a vehicle tire wall (i.e., a wall of vehicle tire 290) in response to osmotic pressure.

MOIT 205 may further include a group of polar magnets 240A and a single polar magnet 240B arranged, in parallel, in a ring formation on an exterior wall coupling nonpermeable membrane ring 220 to semipermeable membrane ring 210. Polar magnets 240A and 240B may be spaced equidistant from each other apart around the ring formation by magnet separators (such as magnet separator 245) placed along the ring formation except at connecting seam 285 (where a pair of polar magnets 240A are separated by polar magnet 240B). In some examples, polar magnets 240A may be arranged in parallel pairs where each polar magnet 240A in the pair has a same polarity as another polar magnet 240A in the pair (e.g., the south pole of a magnet in each pair faces the south pole of the other magnet in the pair and a north pole of a magnet in each pair faces the north pole of the other magnet in the pair). As a result of the arrangement of polar magnets 240A, opposing magnetic forces are generated along the ring formation thereby creating a magnetic field sufficient to support the weight of a vehicle following a puncture of vehicle tire 290. In some embodiments, polar magnets 240A may generate a magnetic field strength sufficient to support the weight of a vehicle even when vehicle tire 290 has no air pressure. For example, the magnetic field generated by polar magnets 240A may prevent compression of the ring formation from pressure caused by a vehicle weight on vehicle tire 290 on a road surface when vehicle tire 290 is in motion on a car that is being driven along a roadway. Polar magnet 240B (located at connecting seam 285) has an opposite polarity to polar magnets 240A such that polar magnet 240B may attract adjoining polar magnets 240A only at connecting seam 285.

Figure 3:
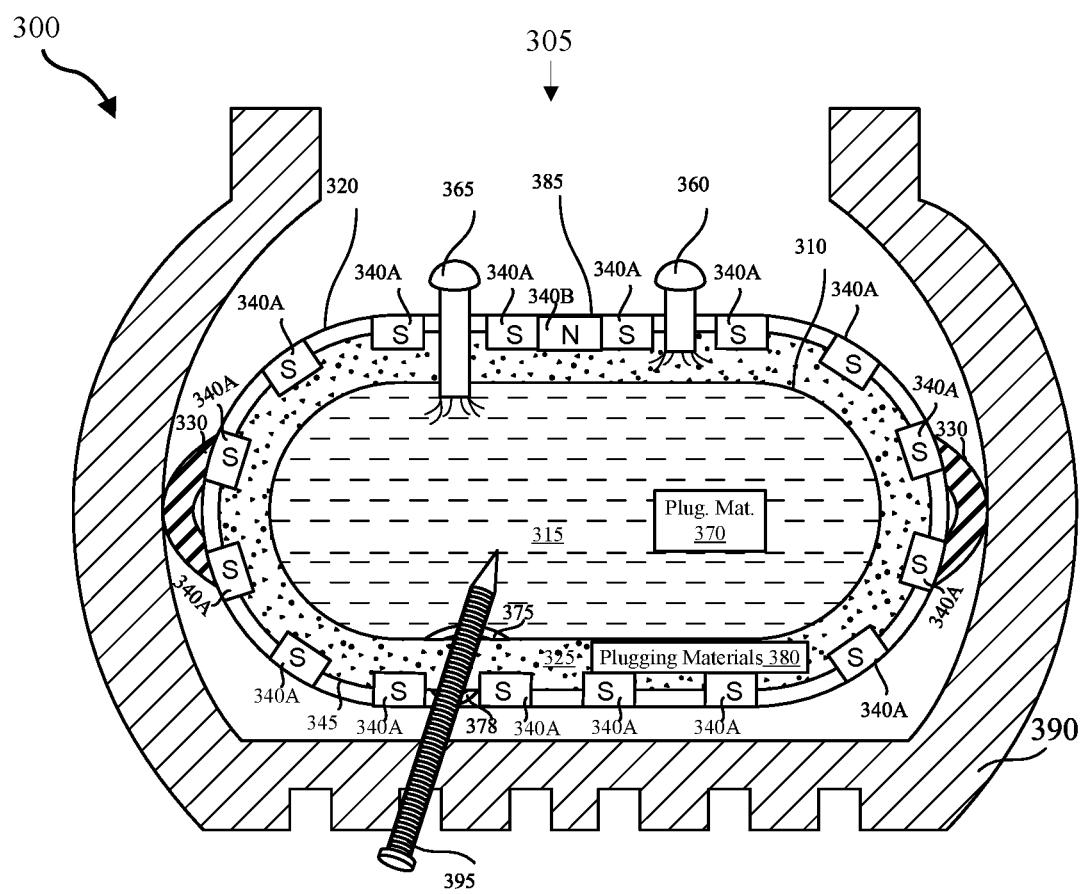
FIG. 3 illustrates a cross-sectional view of a system including a magnetic and osmotic inner tube installed in a vehicle tire following a tire puncture, according to an example embodiment.

Turning now to FIG. 3, a cross-sectional view of a system 300 including a magnetic and osmotic inner tube (MOIT) 305 installed in a vehicle tire 390 that has been punctured by an object 395 (e.g., a nail or screw) is shown. As shown in FIG. 3, MOIT 305 may include a semipermeable membrane ring 310 that includes an interior housing that stores a volume of hypotonic fluid 315 (e.g., fresh water) and plugging materials 370. In some examples, plugging materials 370, which are suspended in hypotonic fluid 315, may include a collection of non-metallic materials such as hair, feathers, and/or fish scales. Semipermeable membrane ring 310 may also be coupled to a fluid inlet 365 which may be a valve for receiving a suspension containing hypotonic fluid 315 and plugging materials 370 from an external source (e.g., a fluid pump) into the interior housing of semipermeable membrane ring 310. In some examples, the interior housing of semipermeable membrane ring 310 may further include a colored dye that is injected (via fluid inlet 365) into the suspension containing hypotonic fluid 315 and plugging materials 370. As will be described in greater detail below, the colored dye may be utilized to identify a location of a puncture in vehicle tire 390 prior to the puncture being sealed by MOIT 305.

MOIT 305 may further include a nonpermeable membrane ring 320 that is coupled to semipermeable membrane ring 310. In some examples, nonpermeable membrane ring 320 includes an interior housing that stores a volume of hypertonic fluid 325 (e.g., saline solution) and plugging materials 380. In some examples, plugging materials 380, which are suspended in hypertonic fluid 325, may include a collection of non-metallic materials such as hair, feathers, and/or fish scales. Nonpermeable membrane ring 320 may also be coupled to a fluid inlet 360 which may be a valve for receiving a suspension containing hypertonic fluid 325 and plugging materials 380 from an external source (e.g., a fluid pump) into the interior housing of nonpermeable membrane ring 320. In some examples, the interior housing of nonpermeable membrane ring 320 may further include a colored dye that is injected (via fluid inlet 360) into the suspension containing hypertonic fluid 325 and plugging materials 380. As will be described in greater detail below, the colored dye (which may have a different color than the colored dye injected into semipermeable membrane ring 310) may be utilized to identify a location of a puncture in vehicle tire 390.

In some examples, hypotonic fluid 315 may be drawn by osmosis through semipermeable membrane ring 310 into hypertonic fluid 325 stored in the interior housing of nonpermeable membrane ring 320 to create an osmotic pressure on the nonpermeable membrane ring 320. In some embodiments, the osmotic pressure on the nonpermeable membrane ring 320 may cause O-ring 330 to seal the exterior surface of nonpermeable membrane ring 320 to a wall of vehicle tire 390. For example, the osmotic pressure may seal MOIT 305 to a lower part of a tire wall of vehicle tire 390 via an adhesive coupled to O-ring 330. In one example, following a puncture of vehicle tire 390 by object 395, a sealant 378 that coats nonpermeable membrane ring 320 and plugging materials 380 may be drawn instantly, via rotational forces, to an opening around object 395 at plug location 375. In this example, the time period for sealing the puncture may be of a sufficiently short duration such that only a small amount of fresh water (e.g., hypotonic fluid 315) and saline solution (e.g., hypertonic fluid 325) escapes through the opening created by object 395 before it is sealed (i.e., plugged). In some embodiments, the fresh water and/or saline solution escaping through the puncture may be colored with the dye injected into semipermeable membrane ring 310 and nonpermeable membrane ring 320. Based on the color of the escaping solution (e.g., red for fresh water and blue for saline), the location of the puncture of vehicle tire 390 and MOIT 305 by object 395, may be easily identified.

The term "osmotic pressure," as used herein, generally refers to the pressure caused by a fluid at different concentrations due to the dilution of the fluid by dissolved molecules (solute), such as saline (e.g., salt). For example, a hypotonic fluid (such as fresh water) has a minimal salt concentration as compared to a hypertonic fluid (such as saline solution) and as such, fresh water molecules will pass (via osmosis) through a semipermeable membrane into the solution having the higher salt concentration thereby creating osmotic pressure.

MOIT 305 may further include a group of polar magnets 340A and a single polar magnet 340B arranged, in parallel, in a ring formation on an exterior wall coupling nonpermeable membrane ring 320 to semipermeable membrane ring 310. Polar magnets 340A and 340B may be spaced equidistant from each other apart around the ring formation by magnet separators (such as magnet separator 345) placed along the ring formation except at connecting seam 385 (where a pair of polar magnets 340A are separated by polar magnet 340B). In some examples, polar magnets 340A may be arranged in parallel pairs where each polar magnet 340A in the pair has a same polarity as another polar magnet 340A in the pair (e.g., the south pole of a magnet in each pair faces the south pole of the other magnet in the pair and a north pole of a magnet in each pair faces the north pole of the other magnet in the pair). As a result of the arrangement of polar magnets 340A, opposing magnetic forces are generated along the ring formation thereby creating a magnetic field sufficient to support the weight of a vehicle following a puncture of vehicle tire 390. In some embodiments, polar magnets 340A may generate a magnetic field strength sufficient to support the weight of a vehicle even when vehicle tire 390 has no air pressure. For example, the magnetic field generated by polar magnets 340A may prevent compression of the ring formation from pressure caused by a vehicle weight on vehicle tire 390 on a road surface when vehicle tire 390 is in motion on a car that is being driven along a roadway. Polar magnet 340B (located at connecting seam 385) has an opposite polarity to polar magnets 340A such that polar magnet 340B may attract adjoining polar magnets 340A only at connecting seam 385.

In some embodiments, as the inflation air of vehicle tire 390 and MOIT 305 are separated by O-ring 330, vehicle tire 390 will maintain enough air pressure and osmotic pressure which, in combination with the magnetic field generated by the ring of polar magnets 340A and 340B, are sufficient to support a vehicle so that it may be driven (e.g., for several miles) without having to replace or repair the puncture. In other embodiments, the ring of polar magnets 340A and 340B may enable the weight of a vehicle to be supported and driven without any air pressure in vehicle tire 390 when installed with MOIT 305 based solely on the strength of the generated magnetic field. In some embodiments, the fresh water, saline solution, and magnetic field of MOIT 305 may further enable a vehicle tire 390 installed with MOIT 305 to absorb impact forces due to rough and bumpy roads, potholes, debris, etc. In this embodiment, road impact forces may be significantly reduced before reaching a vehicle's shock absorbers thereby extending their use on a vehicle and reducing the cost of purchase (e.g., less expensive shock absorbers may be purchased for a vehicle having tires installed with MOIT 305).

As discussed throughout the instant disclosure, numerous advantages may be realized by the nearly instantaneous plugging of vehicle tire punctures utilizing the disclosed MOIT apparatus. For example, a loss of tire pressure following a tire puncture may be significantly minimized due to the separation of a tire's inflation air and the MOIT apparatus by its built-in O-ring. As a result, a vehicle tire may maintain sufficient air pressure, osmotic pressure, and magnetic field forces (via the opposing bar magnets) following a puncture to support a vehicle and allow the vehicle to be further driven for several miles without having to replace or repair the punctured tire. Additionally, a vehicle low air pressure warning system may not be needed due to the minimized loss of tire inflation air.

Another example advantage realized by the disclosed MOIT apparatus may include the ability to continue driving a vehicle even when a loss of tire pressure occurs that is not caused by a tire puncture (e.g., tire pressure loss due to air temperature fluctuations, tire valve malfunctions, etc.). For example, the magnetic field consisting of opposing magnetic forces created by the ring of parallel bar magnets in the MOIT apparatus may prevent compression of a tire due to road pressure and thus continue to support the vehicle for continuous driving.

Yet another example advantage realized by the disclosed MOIT apparatus may include the ability to improve vehicle ride quality when installed in vehicle tires. For example, the combination of the hypotonic (e.g., fresh water), hypertonic (e.g., saline solution), and the magnetic fields generated by the ring of bar magnets may provide improved impact absorption of opposing road forces caused by vehicle travel over rough/bumpy roads, potholes, and debris. Additionally, as a result of the improved impact absorption, road impact forces are greatly reduced before reaching vehicle shock absorbers, thereby increasing the life and/or cost of these vehicle components.

Still further advantages that may be realized by the disclosed MOIT apparatus may include (1) the ability to convert any air inflatable tire into a never flat tire (NFT), (2) the elimination of vehicle owner fears over having a flat tire, (3) the elimination of the need for a vehicle to carry a spare tire and an associated jack device, (4) the ability to quickly and accurately identify the location of tire punctures (i.e., utilizing colored dye), (5) the ability to be easily installed in standard vehicle tires, (6) the ability to be transferred to a new tire thereby requiring only a single purchase (per tire), (7) the ability to allow a driver to continue to accurately control vehicle following a tire puncture, (8) the ability to enable long term vehicle storage without a resulting loss of tire pressure over time, (9) the ability to prevent the disablement of military and/or bulletproof vehicles due to tires being shot or punctured, (10) the ability to reduce the occurrence of tire blowouts, and (11) the ability to avoid utilizing an additional liner (e.g., as utilized by conventional self-sealing tires) to self-plug a punctured tire.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A magnetic and osmotic inner tube for installation in a vehicle tire, comprising:
    a nonpermeable membrane ring formed by an elastic material, the nonpermeable membrane ring comprising an exterior surface and an interior housing, wherein the exterior surface is coated with a sealant, and wherein the interior housing stores a volume of a hypertonic fluid and a first plurality of plugging materials suspended in the hypertonic fluid;
    a semipermeable membrane ring coupled to the nonpermeable membrane ring, the semipermeable membrane ring comprising an interior housing storing a volume of a hypotonic fluid and a second plurality of the plugging materials suspended in the hypotonic fluid, wherein a puncture is created by an object that penetrates the semipermeable membrane ring and the nonpermeable membrane ring, wherein the hypotonic fluid is drawn by osmosis through the semipermeable membrane ring into the hypertonic fluid stored in the interior housing of the nonpermeable membrane ring to create an osmotic pressure on the nonpermeable membrane ring, wherein the osmotic pressure is created by fresh water molecules in the hypotonic fluid passing through the semipermeable membrane ring into the hypertonic fluid, and wherein the second plurality of the plugging materials are drawn, via rotational forces generated by the vehicle tire, to the puncture created by the object;
    an O-ring comprising an adhesive, coupled to the exterior surface of the nonpermeable membrane ring, wherein the osmotic pressure on the nonpermeable membrane ring causes the O-ring to seal the exterior surface of the nonpermeable membrane ring to a wall of the vehicle tire; and
    a plurality of polar magnets arranged in a ring formation on a wall coupling the nonpermeable membrane ring to the semipermeable membrane ring, wherein each one of a set of the polar magnets has a same polarity with respect to another one of the set of polar magnets to generate opposing magnetic forces along the ring formation, wherein the opposing magnetic forces generate a magnetic field that supports a vehicle weight.

2. The magnetic and osmotic inner tube of claim 1, wherein the nonpermeable membrane ring further comprises a first fluid inlet valve that receives the volume of the hypotonic fluid and the first plurality of plugging materials suspended in the hypotonic fluid from an external source into the interior housing.

3. The magnetic and osmotic inner tube of claim 1, wherein the semipermeable membrane ring further comprises a second fluid inlet valve that receives the volume of the hypertonic fluid and the second plurality of the plugging materials suspended in the hypertonic fluid from an external source into the interior housing.

4. The magnetic and osmotic inner tube of claim 1, wherein:
    the interior housing of the nonpermeable membrane ring comprises a first colored dye injected into the volume of the hypotonic fluid and the first plurality of plugging materials suspended in the hypotonic fluid; and
    the interior housing of the semipermeable membrane ring comprises a second colored dye injected into the volume of the hypotonic fluid and the second plurality of the plugging materials suspended in the hypotonic fluid.

5. The magnetic and osmotic inner tube of claim 4, wherein the first colored dye identifies a location of the vehicle tire puncture when a portion of the volume the hypotonic fluid escapes from the vehicle tire.

6. The magnetic and osmotic inner tube of claim 4, wherein the second colored dye identifies a location of the vehicle tire puncture when a portion of the volume the hypertonic fluid escapes from the vehicle tire.

7. The magnetic and osmotic inner tube of claim 1, wherein the opposing magnetic forces generated by the polar magnets prevent compression of the ring formation from pressure caused by a vehicle weight on the vehicle tire on a road surface when the vehicle tire is in motion.

8. The magnetic and osmotic inner tube of claim 1, wherein the first plurality of plugging materials comprises a collection of non-metallic materials, the collection of non-metallic materials comprising a quantity of at least one of hair, feathers, or fish scales.

9. The magnetic and osmotic inner tube of claim 1, wherein the second plurality of the plugging materials comprises a collection of non-metallic materials, the collection of non-metallic materials comprising a quantity of at least one of hair, feathers, or fish scales.

10. A system comprising:
    a vehicle tire; and
    a magnetic and osmotic inner tube coupled to the vehicle tire, comprising:
        a nonpermeable membrane ring formed by an elastic material, the nonpermeable membrane ring comprising an exterior surface and an interior housing, wherein the exterior surface is coated with a sealant, and wherein the interior housing stores a volume of a hypertonic fluid and a first plurality of plugging materials suspended in the hypertonic fluid;

a semipermeable membrane ring coupled to the nonpermeable membrane ring, the semipermeable membrane ring comprising an interior housing storing a volume of a hypotonic fluid and a second plurality of the plugging materials suspended in the hypotonic fluid, wherein a puncture is created by an object that penetrates the semipermeable membrane ring and the nonpermeable membrane ring, wherein the hypotonic fluid is drawn by osmosis through the semipermeable membrane ring into the hypertonic fluid stored in the interior housing of the nonpermeable membrane ring to create an osmotic pressure on the nonpermeable membrane ring, wherein the osmotic pressure is created by fresh water molecules in the hypotonic fluid passing through the semipermeable membrane ring into the hypertonic fluid, and wherein the second plurality of the plugging materials are drawn, via rotational forces generated by the vehicle tire, to the puncture created by the object;

an O-ring comprising an adhesive, coupled to the exterior surface of the nonpermeable membrane ring, wherein the osmotic pressure on the nonpermeable membrane ring causes the O-ring to seal the exterior surface of the nonpermeable membrane ring to a wall of the vehicle tire; and a plurality of polar magnets arranged in a ring formation on a wall coupling the nonpermeable membrane ring to the semipermeable membrane ring, wherein each one of a set of the polar magnets has a same polarity with respect to another one of the set of polar magnets to generate opposing magnetic forces along the ring formation, wherein the opposing magnetic forces generate a magnetic field that supports a vehicle weight.

11. The system of claim 10, wherein the nonpermeable membrane ring further comprises a first fluid inlet valve that receives the volume of the hypotonic fluid and the first plurality of plugging materials suspended in the hypotonic fluid from an external source into the interior housing.

12. The system of claim 10, wherein the semipermeable membrane ring further comprises a second fluid inlet valve that receives the volume of the hypertonic fluid and the second plurality of the plugging materials suspended in the hypertonic fluid from an external source into the interior housing.

13. The system of claim 10, wherein:
the interior housing of the nonpermeable membrane ring comprises a first colored dye injected into the volume of the hypotonic fluid and the first plurality of plugging materials suspended in the hypotonic fluid; and
the interior housing of the semipermeable membrane ring comprises a second colored dye injected into the volume of the hypotonic fluid and the second plurality of the plugging materials suspended in the hypotonic fluid.

14. The system of claim 13, wherein the first colored dye identifies a location of the vehicle tire puncture when a portion of the volume the hypotonic fluid escapes from the vehicle tire.

15. The system of claim 13, wherein the second colored dye identifies a location of the vehicle tire puncture when a portion of the volume the hypertonic fluid escapes from the vehicle tire.

16. The system of claim 10, wherein the opposing magnetic forces generated by the polar magnets prevent compression of the ring formation from pressure caused by a vehicle weight on the vehicle tire on a road surface when the vehicle tire is in motion.

17. The system of claim 10, wherein each of the first plurality of plugging materials and the second plurality of the plugging materials comprises a collection of non-metallic materials, the collection of non-metallic materials comprising a quantity of at least one of hair, feathers, or fish scales.

18. A system comprising:
a plurality of vehicle tires; and
a magnetic and osmotic inner tube inserted into each of the vehicle tires, comprising:
a nonpermeable membrane ring formed by an elastic material, the nonpermeable membrane ring comprising an exterior surface and an interior housing, wherein the exterior surface is coated with a sealant, and wherein the interior housing stores a volume of a hypertonic fluid and a first plurality of plugging materials suspended in the hypertonic fluid;

a semipermeable membrane ring coupled to the nonpermeable membrane ring, the semipermeable membrane ring comprising an interior housing storing a volume of a hypotonic fluid and a second plurality of the plugging materials suspended in the hypotonic fluid, wherein a puncture is created by an object that penetrates the semipermeable membrane ring and the nonpermeable membrane ring, wherein the hypotonic fluid is drawn by osmosis through the semipermeable membrane ring into the hypertonic fluid stored in the interior housing of the nonpermeable membrane ring to create an osmotic pressure on the nonpermeable membrane ring, wherein the osmotic pressure is created by fresh water molecules in the hypotonic fluid passing through the semipermeable membrane ring into the hypertonic fluid, and wherein the second plurality of the plugging materials are drawn, via rotational forces generated by the vehicle tire, to the puncture created by the object;

an O-ring comprising an adhesive, coupled to the exterior surface of the nonpermeable membrane ring, wherein the osmotic pressure on the nonpermeable membrane ring causes the O-ring to seal the exterior surface of the nonpermeable membrane ring to a wall of the at least one of the vehicle tires; and a plurality of polar magnets arranged in a ring formation on a wall coupling the nonpermeable membrane ring to the semipermeable membrane ring, wherein each one of a set of the polar magnets has a same polarity with respect to another one of the set of polar magnets to generate opposing magnetic forces along the ring formation, wherein the opposing magnetic forces generate a magnetic field that supports a vehicle weight.

\* \* \* \* \*